US010389660B2

(12) United States Patent
Hasin et al.

(10) Patent No.: US 10,389,660 B2
(45) Date of Patent: Aug. 20, 2019

(54) IDENTIFYING REPORTS TO ADDRESS NETWORK ISSUES

(71) Applicant: HEWLETT-PACKARD DEVELOPMENT COMPANY, L.P., Houston, TX (US)

(72) Inventors: Noam Hasin, Yehud (IL); Oren Weiss, Yehud (IL); Nataliya Geimakher, Yehud (IL); Aviad Israeli, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 379 days.

(21) Appl. No.: 14/431,414

(22) PCT Filed: Oct. 10, 2012

(86) PCT No.: PCT/US2012/059544

§ 371 (c)(1),
(2) Date: Mar. 26, 2015

(87) PCT Pub. No.: WO2014/058421

PCT Pub. Date: Apr. 17, 2014

(65) Prior Publication Data

US 2015/0281140 A1 Oct. 1, 2015

(51) Int. Cl.

| | |
|---|---|
| ***H04L 12/58*** | (2006.01) |
| ***G06F 16/93*** | (2019.01) |
| ***H04L 12/24*** | (2006.01) |
| ***H04L 12/26*** | (2006.01) |

(52) U.S. Cl.
CPC .............. *H04L 51/04* (2013.01); *G06F 16/94* (2019.01); *H04L 41/069* (2013.01); *H04L 43/06* (2013.01); *H04L 43/0817* (2013.01); *H04L 43/0852* (2013.01)

(58) Field of Classification Search
USPC ............... 709/206, 223, 224; 706/45, 47, 50
See application file for complete search history.

(56) References Cited

U.S. PATENT DOCUMENTS

| | | | |
|---|---|---|---|
| 6,321,338 | B1 | 11/2001 | Porras et al. |
| 7,694,115 | B1 | 4/2010 | Porras et al. |
| 8,180,724 | B1 | 5/2012 | Qureshi et al. |

(Continued)

FOREIGN PATENT DOCUMENTS

| | | |
|---|---|---|
| CN | 101640603 | 2/2010 |
| CN | 101893863 | 11/2010 |
| KR | 20050003240 A | 1/2005 |

OTHER PUBLICATIONS

Korean Intellectual Property Office, International Search Report and Written Opintion, dated Apr. 10, 2013, 10 pages, Daejeon Metropolitan City, Republic of Korea.

(Continued)

*Primary Examiner* — Younes Naji
*Assistant Examiner* — Da T Ton

(57) ABSTRACT

Identifying reports to address network issues includes identifying a report, according to a recommendation strength, in a reports library that is recommended to address a previously identified network issue that matches a current network issue, sending a link to the identified report, and updating a recommendation strength based on whether the identified report is used to address the current issue.

16 Claims, 6 Drawing Sheets

(56) References Cited

U.S. PATENT DOCUMENTS

| | | | | | |
|---|---|---|---|---|---|
| 8,341,650 | B1 * | 12/2012 | Veerabhadraiah | G06F 11/3433 | 714/1 |
| 8,954,420 | B1 * | 2/2015 | Khan | G06F 17/30867 | 707/722 |
| 2004/0153693 | A1 | 8/2004 | Fisher et al. | | |
| 2004/0193958 | A1 | 9/2004 | Shah | | |
| 2005/0097517 | A1 * | 5/2005 | Goin | H04L 41/0803 | 717/124 |
| 2005/0114180 | A1 * | 5/2005 | Ploetz | G06Q 50/22 | 705/2 |
| 2006/0190435 | A1 * | 8/2006 | Heidloff | G06F 17/30675 | |
| 2007/0061128 | A1 * | 3/2007 | Odom | G06F 19/325 | 704/4 |
| 2008/0155091 | A1 | 6/2008 | Gokhale et al. | | |
| 2009/0019314 | A1 * | 1/2009 | Younger | H04L 41/00 | 714/37 |
| 2009/0199054 | A1 * | 8/2009 | Embree | G06Q 30/02 | 714/57 |

OTHER PUBLICATIONS

Metaquest Software, Triage: Single-Clici eSupport Splution, 2 pages, http://www.metaquest.com/solutions/esupport/esupport.html.

Network Instruments, Network Instruments® Enhanced Observer Platform Automates Application Mapping, Triage and Resolution for Quicker Network/it Response, Aug. 13, 2012, 5 pages, http://itbriefing.net/modules.php?http://itbriefing.net/modules.php?

Uptime Software, React Fast to IT Problems and Be MOre Proactive, http://www.uptimesoftware.com/mttr.php.

European Patent Office, Extended European Search Report for App No. 12886202.6 dated May 11, 2016 (11 pages).

* cited by examiner

500

| Transaction/ Location | New Youk | Tel Aviv | Tokyo |
|---|---|---|---|
| Login | Failed | Failed | Failed |
| Buy | Failed | Failed | Failed |
| Logout | Failed | Failed | Failed |

| Availability Reports | | | |
|---|---|---|---|
| # of Transaction/ # of Location | One Location | Some Locations | All Locations |
| 1 Failure | Error Report | | |
| Some Failures | | Location over Time Report | |
| All Failures | | | Error Log Report |

IDENTIFYING REPORTS TO ADDRESS NETWORK ISSUES

CROSS-REFERENCE TO RELATED APPLICATION

This application is a national stage application under 35 U.S.C. § 371 of PCT/US2012/059544, filed Oct. 10, 2012.

BACKGROUND

Network management systems help administrators detect and solve issues faced by various applications running in data centers and other types of networks. Such systems monitor various aspects of the network, such as application response time, resource utilization, and other issues. The management systems collect the monitoring data and use it to detect the issues.

BRIEF DESCRIPTION OF THE DRAWINGS

The accompanying drawings illustrate various examples of the principles described herein and are a part of the specification. The illustrated examples are merely examples and do not limit the scope of the claims.

FIG. 5 is a diagram of an example of a matrix of data according to principles described herein.

FIG. 6 is a diagram of an example of a look-up table according to principles described herein.

DETAILED DESCRIPTION

Often, a network issue involves a root cause that creates multiple downstream effects on the network. In some situations, the downstream effects are severe and bog down the entire network or at least portions of the network. Due to an interdependency of network components, an administrator may have difficulty distinguishing between symptoms of the issue and the actual root cause in the network without an appropriate report. Due to the variety of potential downstream effects produced by the root cause of the issue, an inexperienced administrator may initially become confused when responding to the issue and spend valuable time treating downstream effects instead of addressing the issue's root cause.

An administrator who observes issues generally identifies a report to address the situation. Generally, the administrator searches for report that he hope will help him to determine the root cause of the issue because resolving the root cause is generally the fastest way to resolve all the effects of the issue. An administrator may search for an appropriate report generated by the system to identify the root cause. However, the administrator needs to know which report will best help to diagnosis the issue. Even where the administrator knows which report he needs, the administrator still needs to take time to locate the report. This time could otherwise be spent addressing the root cause of the issue.

Consequently, the principles described herein include a method for identifying reports to address network issues. Such a method may include identifying a report, according to a recommendation strength, in a reports library that is recommended to address a previously identified network issue that matches a current network issue, sending a link to the identified report, and updating the recommendation strength based on whether the identified report is used to address the current issue.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
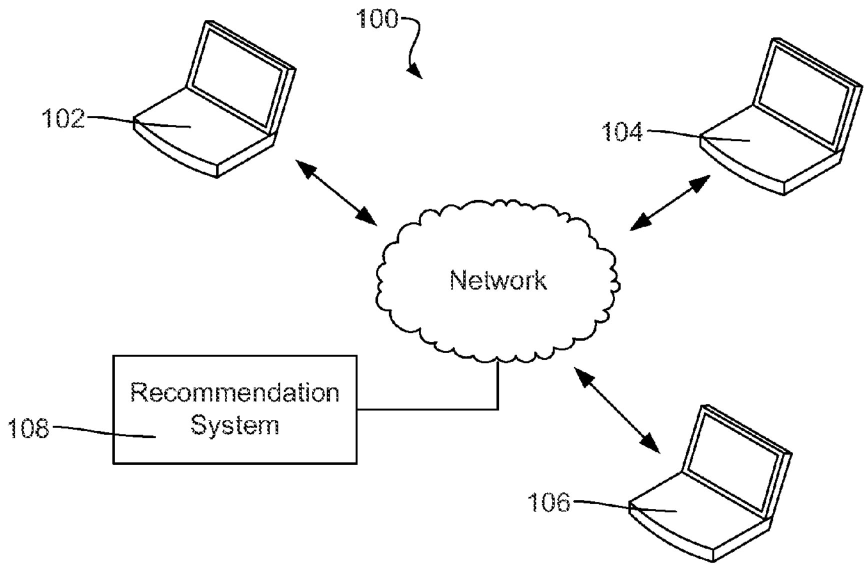
FIG. 1 is a diagram of an example of a network according to principles described herein.

FIG. 1 is a diagram of an example of a network (100) according to principles described herein. In this example, the network (100) includes network components (102, 104, 106) that are in communication with each other. For example, components may have the ability to be servers, clients, nodes, or other components of a network. In some examples, at least one of the network components (102, 104, 106) hosts a website while network users may access the contents of the website through the other components.

A non-exhaustive list of network types compatible with the principles described herein includes local area networks, data center networks, telecommunications networks, operating center networks, corporate networks, intranets, virtual private networks, data storage networks, database networks, other type of networks, or combinations thereof. A non-exhaustive list of network components compatible with the principles described herein includes laptops, desktops, electronic tablets, servers, peripheral devices, databases, phones, processors, other network components, or combinations thereof.

The network (100) is in communication with a recommendation system (108) that is implemented to assist a network administrator to triage issues with the network by identifying an appropriate report to assist the administrator in determining the root cause of the network issue. The identified report is selected based on both the similarity of the conditions between the current network issue and the previously identified issues and a recommendation strength of a report. For example, if a network experiences a slow data transfer in a specific region of the network, then the recommendation system (108) looks to previously identified network issues where the data transfer was slow in the same area. If no previously identified issues included those conditions, then the recommendation system (108) would look for the previously identified issues with as close to the same symptoms as the current network issue. In response to identifying the previously identified issues that either matches or nearly matches the current network conditions, the recommendation system (108) identities the report that has a recommendation strength for the previously identified issues. If there are multiple reports relevant for the previously identified issues, the recommendation system (108)

identifies which of the reports has the highest recommendation strength for the current and/or previously identified network issue.

The recommendation strength is based on the factors included in a recommendation policy. The recommendation policy may base the recommendation strength in whole or in part on which reports are used by the network administrator to triage the current issue in the network. The administrator's usage of reports to address the network's issues may be tracked with a counter value that is added to each report used by the administrator to address the current network issue.

An administrator may be an employee of an organization that maintains a network, a network manager, a technician, a user, or another individual impacted by the network, or combinations thereof. The recommendation system (108) may cause information about the network to be gathered and analyzed to determine if an issue exists. Further, the recommendation system (108) may cause an identified report to be identified and sent to the administrator. In some examples, a link to the report is sent to the administrator along with a message that summarizes the issue.

Figure 2:
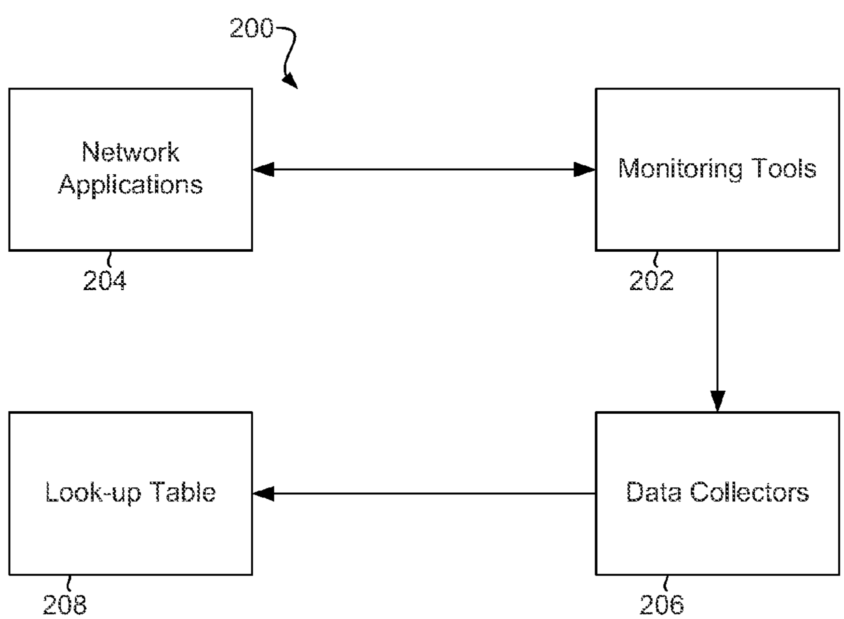
FIG. 2 is a diagram of an example of a data collection mechanism according to principles described herein.

FIG. 2 is a diagram of an example of a data collection mechanism (200) of a network according to principles described herein. In some examples, the data collection mechanism has monitoring tools (202) that collect data about the network's applications (204). The monitoring tools (202) may record information relating to network latency, response times, application failures, application successes, other status information, or combinations thereof. In some examples, the monitoring tools include components that are installed on customer application servers. In some examples, the monitoring tools are located in external networks to observe the experience of outsiders, such as customers, who are attempting to use the network's services. In some examples, at least some of the monitoring tools are internal to the network.

The monitoring tools (202) send at least some of the recorded data to data collectors (206) where the information is stored. In some examples, just selected samples are sent to the data collectors (206), while in other examples all of the information is sent. In some examples, the information is sent to the data collectors (206) in real time, while in other examples, the information is sent on a periodic basis. The data collectors (206) may request information from the monitoring tools (202) or the monitoring tools (202) may send the information to the data collectors (206) without request.

At least some of the information stored in the data collectors (206) is sent to a look-up table (208) that associates appropriate reports and messages with various network conditions. For example, the look-up table (208) may indicate that, when all attempted login transactions from just a single site fail, there is an issue with that site. For this particular issue, the look up table (208) indicates that a link to a particular report and message should be sent to the network administrator. For example, the look-up table (208) may indicate that when all of the login transactions fail from all possible login sites, the website is down. Under these circumstances, the look-up table (208) may indicate that a different report and message should be sent to the network administrator triaging the current network issue.

Figure 3:
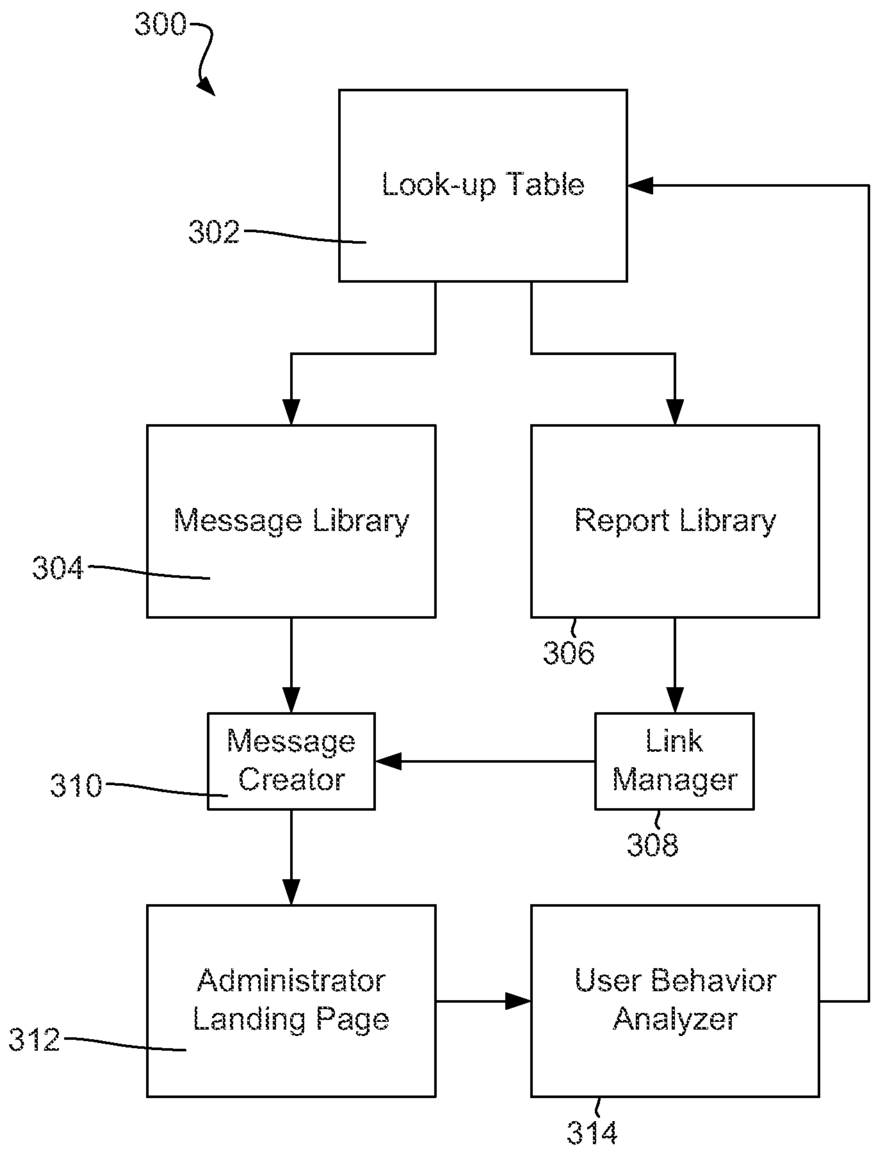
FIG. 3 is a diagram of an example of a recommendation system according to principles described herein.

FIG. 3 is a diagram of an example of a recommendation system (300) according to principles described herein. In this example, the recommendation system (300) includes the look-up table (302), which is connected to a message library (304) and a reports library (306). The message library (304) includes multiple messages that are associated with the message identified in the look-up table for the various network issues. In some examples, each of the messages summarizes the network's condition in a single sentence or multiple sentences. In alternative examples, the messages include recommended instructions for how to remedy the situation The reports library (306) may include multiple reports that are associated with each of the network situations. In some examples, multiple reports are appropriate for a single issue. Further, a particular report may be used for multiple issues. In some examples, each message has a customized report for the particular type of issue described in the message. In other examples, a single report is appropriate to send with multiple messages.

A recommended message and an identified report are identified in the look-up table (302) for each type of network issue. In response to recognizing an issue identified in the look-up table (302), the recommendation system (300) will cause a message and a link to a corresponding report to be sent to the network administrator.

A link manager (308) may create a link to the identified report and embed the link into the message. The link may be sent to a message creator (310) that copies the message from the message library (304) into a message field and embeds the link from the link creator (308).

In response to completing the message, the message may be sent to an administrator landing page (312) or to another location that may be accessed by the administrator. In some examples, the message and link are sent to the administrator's email, phone, electronic tablet, a website, another location, or combinations thereof. In some examples, an alert is also sent to the administrator at a different location than the location that the message was sent. Such an alert may notify the administrator that a message was sent to the other location and request that the administrator view the message. In some examples, the alert contains the same or similar wording as the message from the message library.

In some examples, the landing page may have a list of monitored applications and a status next to each of the applications. In examples where a message and link to a report are sent to the landing page, the status may indicate that there is a message. The link may appear next to the status to give the administrator easy access to the report.

In the example of FIG. 3, the recommendation system (300) also includes a user behavior analyzer (314). The user behavior analyzer (314) determines how the administrator responds to the message and recommends that a report be sent to him. For example, the user behavior analyzer (314) may determine whether the administrator viewed the identified report. The user behavior analyzer (314) may also determine whether other reports were viewed by the administrator in connection with the current issue. In response to the user behavior analyzer (314) sending its findings to the look-up table (302) the look-up table (302) changes the identified report based on the updated recommendation strengths of the relevant reports. For example, if the look-up table (302) indicates that report A should be sent to the administrator in response to recognizing a particular network condition, but the administrator never views report A, then the look-up table (302) may replace report A for another report that the administrator actually used in response to triaging that issue. Further, if the user behavior analyzer (314) recognizes that the administrator uses the identified report occasionally, but that the administrator uses other reports more frequently, the recommendation system (300)

may cause the information in the look-up table (302) to change to reflect what report or reports the administrator generally uses.

In some examples, the user behavior analyzer (314) analyzes not just which reports are used, but also how long the administrator uses those reports or how frequently the administrator refers to the reports while dealing with the situation. In other examples, the user behavior analyzer (314) also determines if the report viewed by the user is relevant to the network's current condition or shares similar information with the identified report. The user behavior analyzer (314) may also calculate the time duration between viewing a report and resolving the issue. In some examples, other factors contribute to determining which report should be the identified report. These and other factors may be accounted for in the recommendation policy that governs how the identified report is selected. The user behavior analyzer (314) may include a learning program that considers these and other factors for analyzing the administrator's response to the message and identified report.

Figure 4:
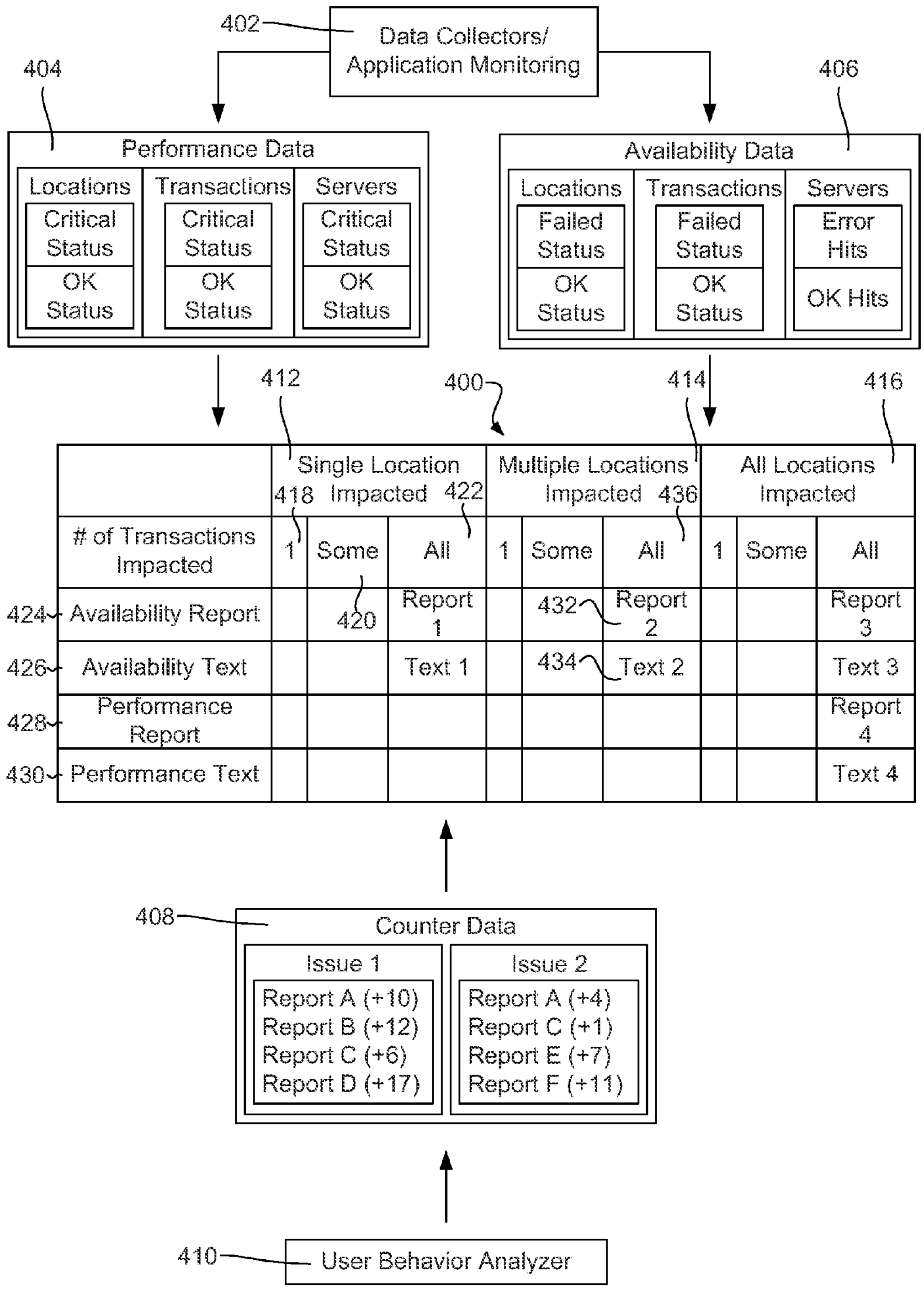
FIG. 4 is a diagram of an example of a look-up table database according to principles described herein.

FIG. 4 is a diagram of an example of a look-up table database (400) according to principles described herein. In this example, data collectors and application monitoring programs (402) gather and store data about the network's conditions. This information may be sent to the look-up table database (400).

At least two types of information are provided to the look-up table database (400). Here, performance data (404) includes information about locations in the network, the transactions in the network, servers in the network, other parameters of the network, and combinations thereof. The performance data (404) may indicate that each of these network parameters are functioning properly, or the performance data (404) may indicate that at least one of the parameters has a critical status.

The availability data (406) includes additional information about the locations, transactions, servers, other parameters of the network, or combinations thereof. While the performance data (404) may include information about how the locations, transactions, servers, and other parameters are performing, the availability data may indicate whether these parameters of the network are functioning at all. For example, the availability data (406) may indicate whether network components are effectively available to the rest of the network by whether they work or fail entirely. If a particular type of transactions occurs, although slowly, the availability data (406) indicates that the transaction is okay, but the performance data may indicate that the particular transaction has a critical status due to its slow performance.

Further, the look-up table database (400) may receive counter data (408) from a user behavior analyzer (410). In some examples, the counter data (408) includes tracking which reports the administrators used to triage previously identified issues in the network. In some examples, these reports actually used are the same reports as those recommended with the recommendation system (FIG. 1, 108). In other examples, the reports may be additional reports viewed by the administrator or reports that the administrator viewed in lieu of the identified reports.

In some examples, each report may receive a counter value of plus one (+1) for each time that an administrator views the report in response to a particular situation. The counter value may be additive; thus, each time a report is viewed in response to a particular issue, the counter value for that report will increase. Consequently, the recommendation strength for that particular report increases as the counter values increase. Thus, the recommendation strength is updated in response to the user's behavior. In such an example, each time that a particular situation arises, the recommendation system may remember which reports the administrator consistently uses to address the issue and may send a link to the historically used report as the identified report.

The counter values may be stored in the look-up table database (400). As the number of counter values increases for a particular report associated with a particular situation, the recommendation strength for the associated report increases. Several reports may be associated with the same situation. The report with the highest counter value may have the highest recommendation strength. However, when an originally identified report for a particular situation is surpassed by new report with a higher counter value, the new report obtains the higher recommendation strength for that particular situation. For example, if a first report has a counter value of twelve and a second report has a counter value of fifteen, the first report has the higher recommendation strength. However, if the administrators disregard the second report and use the first report instead, eventually, the first report's counter value will surpass the second report's counter value giving the first report the higher recommendation strength.

The look-up table database (400) may be broken down into several columns (412, 414, 416). Each of the columns (412, 414, 416) may be further broken down into sub-columns. For example, the first column (412) may schematically represent a single location that is impacted by the issue. A first sub-column (418) of the first column (412) may schematically represent that a single transaction associated with that location was impacted. A second sub-column (420) may schematically represent that some transactions associated with that location were impacted while a third sub-column (422) may schematically represent that all of the transactions dealing with that location were impacted by the issue. The second column (414) may schematically represent multiple locations impacted by the issue while the third column (416) may schematically represent that all locations are impacted by the issue. Each of the second and third columns (420, 422) may also include sub-columns similar to those described in connection with the first column (412).

In general, issues can be characterized as being caused by the availability of network components or by a lack of performance by network components. The look-up table database (400) may also include multiples rows (424, 426, 428, 430). A first row (424) schematically represents a recommended availability report detailing network component availability, a second row (426) schematically represents a recommended availability text for the message to send to the administrator, a third row (428) schematically represents a recommended performance report, and a fourth row (430) schematically represents a recommended performance text for the message to send to the administrator.

In the example of FIG. 4, the look-up table data database (400) may be used to determine which message and report to recommend to an administrator based on the conditions of the network. For example, if all of the transactions are affected by an issue at multiple locations, then the look-up table database (400) may determine to recommend Text 2 for the message to the administrator and to include a link to Report 2 in that message. Report 2 and Text 2 may be located at the intersections (432, 434) of a third sub-column (436) of the second column (414) and the first and second rows (424, 426) since these rows describe characteristics of the conditions of the network caused by the issue.

The look-up table database (400) refers to reports that are in the reports library. A non-exhaustive list of reports that the reports library may contain include a layer breakdown report that helps to identify the layer in which the issue exists, an error log report that helps find application availability data, a location over time report that allows the administrator to view the successful transactions that have occurred over time at a particular location, other reports, or combinations thereof.

FIG. 5 is a diagram of an example of a matrix (500) of data according to principles described herein. In this example, the columns (502, 504, 506) schematically represent locations while the rows (508, 510, 512) schematically represent transaction types. In the example of FIG. 5, a first column (502) schematically represents the location of New York City, a second column (504) schematically represents the location of Tel Aviv, and a third column (506) schematically represents the location of Tokyo. The locations may be cities or other geographic regions where customers or others seek to access services of the network. Also, in the example of FIG. 5, a first row (508) schematically represents a login transaction, a second row (510) schematically represents a buying transaction, and a third row (512) schematically represents a logout transaction. In the illustrated example, each of the transaction types has failed at all of the identified locations.

This matrix (500) of data may be compared to the information in the look-up table database. The recommendation system may compare this information to that in the look-up table database to determine what type of issue likely exists. In this example, the look-up table database is likely to indicate that such network conditions indicate that a website is down. Accordingly, the system may create a message indicating that the website is down and further embed a link in the message to an identified report to assist the administrator is triaging the issue.

FIG. 6 is a diagram of an example of a look-up table (600) of availability reports according to principles described herein. In this example, the columns (602, 604, 606) schematically represent a number of failures caused by the issue while the rows (608, 610, 612) schematically represent a number of transactions affected by the issue. In the example of FIG. 6, a first column (602) schematically represents a single location impacted by the issue, a second column (604) schematically represents multiple locations impacted by the issue, and a third column (606) schematically represents all of the locations impacted by the issue. Also, in the example of FIG. 6, a first row (608) schematically represents a single failure caused by the issue, a second row (610) schematically represents multiple failures caused by the issue, and a third row (612) schematically represents that all of the transactions are failures because of the issue.

The look-up table (600) includes several identified reports (614, 616, 618) at the intersections of the columns and the rows that characterize the network's conditions. In the illustrated example, the reports deal with availability information. Here, the look-up table recommends an error report (614) where the network conditions include just one failure at just one location. Also, in this example, the look-up table recommends a location over time report (616) where the network's conditions include multiple failures at multiple locations. Further, in the example of FIG. 6, an error log report is recommended where the network's conditions include all of the transactions failing at all of the locations.

Figure 7:
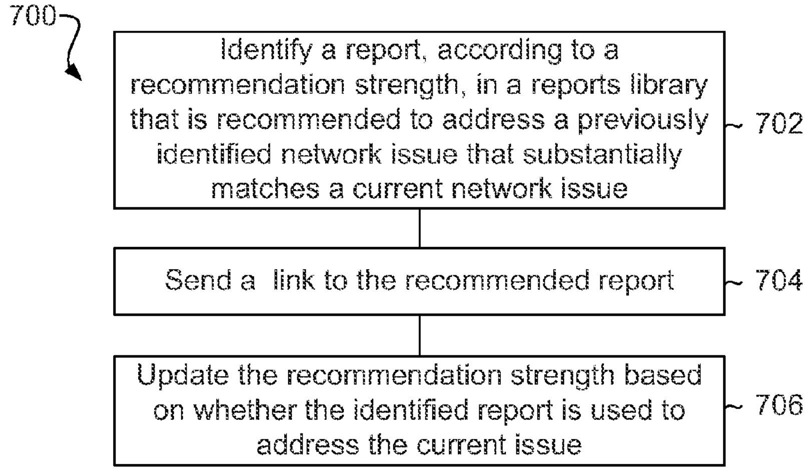
FIG. 7 is a diagram of an example of a method for identifying reports to address network issues according to principles described herein.

FIG. 7 is a diagram of an example of a method (700) for identifying reports for addressing network issues according to principles described herein. In this example, the method (700) includes identifying (702) a report, according to a recommendation strength, in a reports library that is recommended to address a previously identified network issue that matches a current network issue, sending (704) a link to the identified report, and updating (706) the recommendation strength based on whether the identified report is used to address the current issue. The recommendation strength corresponds to the identified report and the previously identified network issue.

The identified report is relevant for addressing network issues that match a current issue if the current issues and the current network issues match or nearly match. A current network issue and a previous network issue may be considered to match if the are identical or at least similar. The recommendation system may have a similarity threshold that considers various factors, such as type of issue symptoms, severity of the issue symptoms, the affected network components, other factors, or combinations thereof, In some examples, the information that is compared against the look-up table is recently collected status information about the network's condition. For example, the status information used to determine whether there is an issue may be data that has just been collected within a predetermined time period, such as the last hour or less.

In some examples, the identified report is considered to be the most relevant report from the report library for addressing the issue. In some examples, the most relevant report is a report that has the greatest effect of reducing the time to resolution of the issue. In some examples, the most relevant report is based on just input that the system determines should help an administrator triage the issue most quickly. The most relevant report may include feedback based on the historic behavior of administrators as they have dealt with the same or similar issues in the past. In some examples, an administrator has an option to specify to the system which report the administrator wants for particular issues.

Sending a message summarizing the issue may include sending the message and accompanying link to an administrator's landing page. In some examples, the message and link are sent to every administrator who is assigned to manage or maintain the network. In other cases, the message and link may be sent to a specific administrator responsible for issues of the kind then occurring. In some examples, the message and link are sent to emails, phones, websites, other locations, or combinations thereof to reach the administrator quickly. The message and link may be sent to a first location while alerts are sent to a second location. For example, a recorded voice message may be left on the user's voice mail to alert the administrator that a message and link have been sent to the first location.

In some examples, the recommendation policy involves referencing a look-up table that describes various conditions of the network to the network's actual conditions. If the conditions of the network match or nearly match the parameters specified in the look-up table, the system may send a message that summarizes the condition along with a link to an identified report with the highest recommendation strength for the matching conditions. In some examples, the recommendation policy includes using recent data about the conditions of the network. Recent data may include data that has been collected about the network within a predetermined time period, such as within the last hour or less.

In some examples, the conditions of the network during an issue do not reflect parameters identified in the look-up table. In such examples, the look-up table may recommend a report that would be recommended for similar conditions. However, as the administrator triages the issues, the system analyzes the administrator's behavior to determine which report is the most relevant based on the administrator's behavior. Based on the administrator's actual behavior, a new entry can be created in the look-up table for the current network conditions. Then, when these conditions recur, the look-up table will recommend a report based on the administrator's previous behavior in addressing similar conditions.

In some examples, the information in the look-up table takes into account counter values that reflect a number of times that each report in the report library was opened in response to previously identified issues. In some examples, the recommendation policy includes determining recommendation strengths in whole or in part on the counter values.

Figure 8:
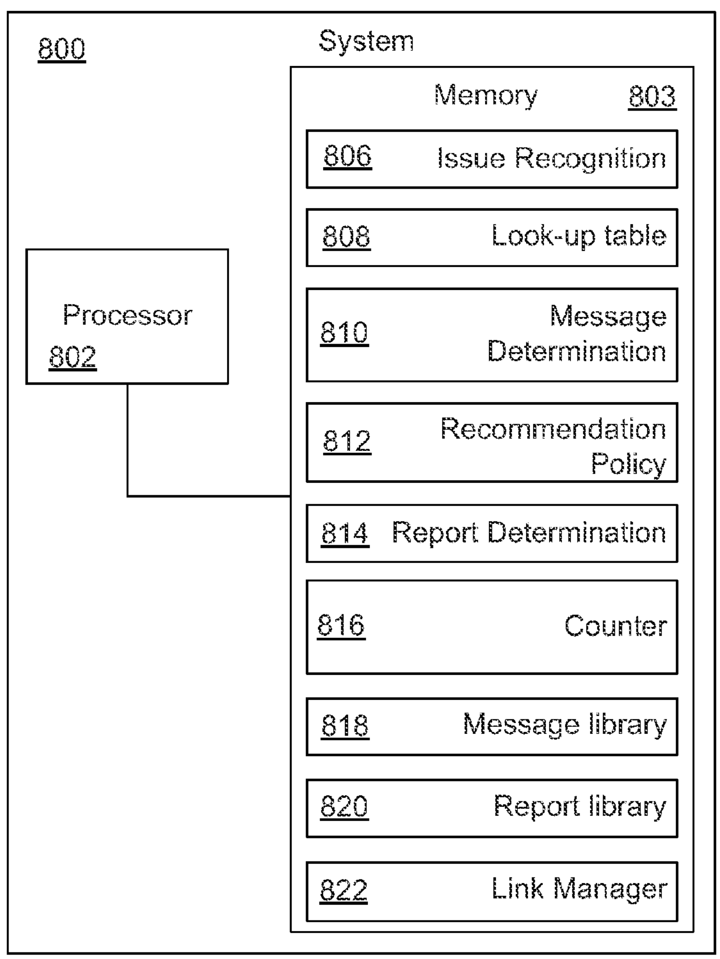
FIG. 8 is a diagram of an example of a processor according to principles described herein.

FIG. 8 is a diagram of an example of a recommendation system (800) according to principles described herein. In this example, the recommendation system (800) includes a processor (802) that is in communication with memory (803). The memory (803) represents generally any memory capable of storing data such as program instructions or data structures used by the recommendation system. The program instructions shown stored in memory (803) include an issue recognition module (806), a message determination module (810), a report determination module (814), a counter (816), and link manager (822). The data structures shown stored in memory (803) include a look-up table (808), a recommendation policy (812), a message library (818), and a report library (820).

The memory (803) is a computer readable storage medium that contains computer readable program code to cause tasks to be executed by the processor (802). The computer readable storage medium may be tangible and/or non-transitory storage medium. A non-exhaustive list of computer readable storage medium types includes non-volatile memory, volatile memory, random access memory, memristor based memory, write only memory, flash memory, electrically erasable program read only memory, or types of memory, or combinations thereof The issue recognition module (806) represents program instructions that, when executed, cause the processor (802) to recognize when an issue exists in the network. The issue recognition module (806) may receive input from the monitoring tools. Look up table (808) represents a data structure that associates identified reports with previously identified network issues. When the issue recognition module (806) is executed, it causes the processor to (806) analyze data from the network's monitoring tools or other sources by comparing the received data to the information in the look-up table (808). If the comparison reveals that there is a match or a close match between the network's current conditions and the parameters identified in the look-up table (808), the issue recognition module (806) causes the processor (802) to recognize an issue.

The look-up table (808) may also indicate which reports and messages should be sent to a network administrator to assist the administrator in triaging the issue. The message determination module (810) represents program instructions that, when executed, cause the processor (802) to determine which message should be sent to the administrator based on the conditions of the network. In some examples, the message is a single sentence that briefly summarizes the issue in the network. In other examples, the message includes comprehensive details about the issue.

The recommendation policy (812) represents a Hat of weighted factors for determining the recommendation strength. The factors may include both the conditions of the network as well as the administrator's past behavior when responding to previously identified issues. The report determination module (814) represents program instructions that, when executed, cause the processor (802) to determine which report to identify based on the data in the look-up table and the recommendation policy. The report determination module (814) may reference the recommendation policy (812) to determine how much weight to assign the network's conditions verses how much to weight to assign the administrator's behavior.

The user behavior is tracked though a counter (816), which represents program instructions that, when executed, cause the processor (802) to assign a counter value to each report per type of issue based on the administrators' past behavior or direct input. The counter value represents a recommendation strength per report for each particular network issue, and the counter values are recorded and stored in the look-up table. If a user opens an identified report sent to him in response to the recommendation system, then the counter's program instructions cause an additional counter value (+1) to be associated with the identified report for that particular issue. The recommendation policy (812) is a data structure that contains a rule that specifies the report with the highest counter value for each particular issue has the highest recommendation strength and should therefore be the identified report. Thus, the report determination module. (814) may refer to the look-up table to retrieve the types of reports associated with previously identified network issues and to retrieve the counter values. In alternative examples, the recommendation policy (812) has a rule that specifies the counter value is one of several factors for the report determination module (814) to consider when identifying the report, and the report determination module (814) references other locations for additional information to consider when identifying the report.

The message determination module (810) represents program instructions that, when executed, cause the processor (802) to determine which message to send with the report. In response to determining which message and report to recommend to the administrator, the message determination module (800) causes the processor (802) to retrieve the recommended message from a message library (818) and the identified report from a report library (820). The message library (818) is a data structure that stores messages that describe the potential issues of the network, and the report library (820) is another data structure that stores the reports referenced in the look-up table (808). The message and report may be customized for a specific administrator. A link manager (822) represents program instructions that, when executed, causes the processor (802) to create or otherwise identify a link to the report. The link manager (822) also causes the processor (802) to embed the link into the message to be sent to the administrator when the link manager's instructions are executed.

Further, the memory (803) may be part of an installation package. In response to installing the installation package, the programmed instructions of the memory (803) may be downloaded from the installation package's source, such as an insertable medium, a server, a remote network location, another location, or combinations thereof. Insertable memory media that are compatible with the principles described herein include DVDs, CDs, flash memory, insertable disks, magnetic disks, other forms of insertable memory, or combinations thereof.

In some examples, the processor (802) and the memory (803) are located within the same physical component, such as a server, or a network component. The memory may be part of the physical component's main memory, caches, registers, non-volatile memory, or elsewhere in the physical component's memory hierarchy. Alternatively, the memory (803) may be in communication with the processor (802) over a network. Further, the data structures, such as the libraries (818, 820) and recommendation policy (812) may be accessed from a remote location over a network connection while the programmed instructions are located locally.

The recommendation system (800) of FIG. 8 may be part of a general purpose computer. However, in alternative examples, the recommendation system (800) is part of an application specific integrated circuit.

Figure 9:
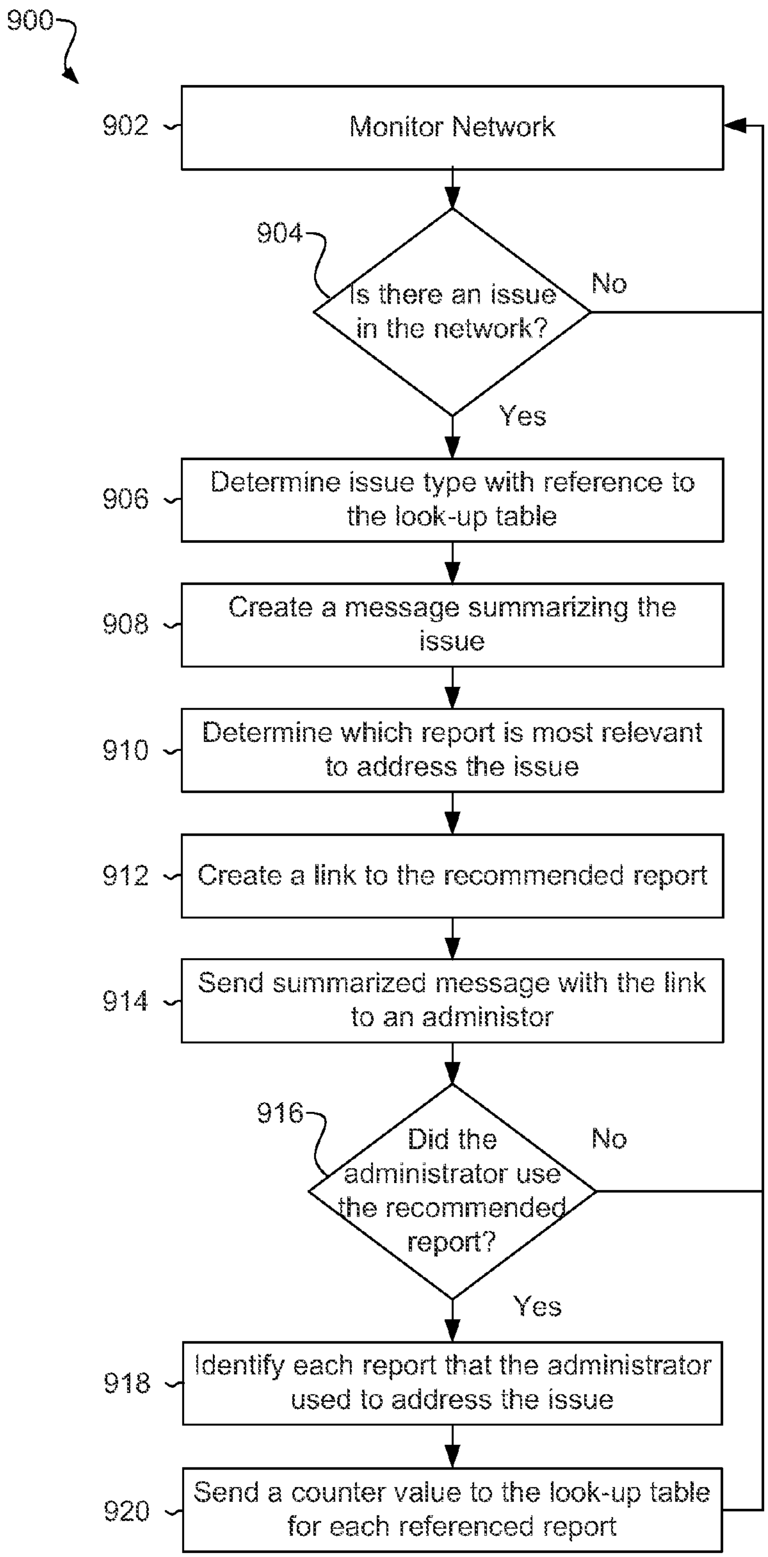
FIG. 9 is a diagram of an example of a flowchart of a process for identifying reports to address network issues according to principles described herein.

FIG. 9 is a diagram of an example of a flowchart (900) of a process for identifying reports for addressing network issues according to principles described herein. In this example, the process includes monitoring (902) the network and determining (904) whether there is an issue in the network. If there is no issue, the process includes continuing to monitor (902) the network.

If an issue in the network is detected, the process includes determining (906) the issue type by referencing a look-up table creating (908) a message summarizing the issue, and determining (910) which report is most relevant to address the issue. The process also includes creating (912) a link to the identified report and sending (914) the summarized message with the link to an administrator to triage the issue.

The process includes determining (916) whether the administrator used the identified report. If the administrator did use the identified report to triage the issue, then the process includes continuing to monitor (902) the network. If the administrator did not use the identified report, then the process includes identifying (918) each report that the administrator used to address the issue and sending (920) a counter value to the look-up table for each referenced report by the administrator to triage the issue.

While the examples above have been described with specific reference to look-up table information, numbers of look-up table rows, number of look-up table columns, types of information received by look-up table databases, any look-up table characteristics and/or parameters may be used that are compatible with the principles described herein. Further, while specific devices and mechanisms have been described above to collect data or monitor the network, any devices or mechanisms and any arrangement thereof for collecting data and/or monitoring the network may be used in accordance with the principles described herein.

Also, while the examples above have been described with specific reference to ways that a recommendation system learns to modify the look-up table's recommendations to account for the administrators' behavior, any learning mechanism may be used in accordance with the principles described herein. Further, while the examples above have been described with reference to specific ways to determine counter values, any mechanism for ranking identified reports may be used.

Further, in some examples, the system may recommend more than one report per issue. Such an example may occur when the administrator's behavior indicates that the administrator generally relies on multiple reports to triage that particular issue. Further, the reports and messages may be customized to specific users. In examples where more than one administrator manages a network, the system may determine which administrator is triaging the issue and may send reports customized for that administrator. Further, in other examples, the system may send customized reports to each of the users so that whichever administrator triages the issue first already has their customized message and report. In some examples, the system will recommended different reports for different administrators for the same issues based on those administrators' behavior. In examples where an administrator is new to a particular network, the system may send identified reports to the new administrator based on the behavior of the other network administrators.

While the examples above have been described with reference to specific messages, any type of message that is compatible with the principles described herein may be used. For example, a more detailed explanation of the issue may be sent to the user. Further, a link to the message may be sent to the user in lieu of sending a message. Further, the message may be a single sentence, be multiple sentences, be written in short hand, visually depict the issue with symbols, have other characteristics, or combinations thereof. In some examples, the message is sent in multiple languages and formats to assist as many administrators as possible.

Further, while the examples above have been described with reference to specific types of data about the condition of the network, any type of data that is compatible with the principles described herein may be used. For example, performance data, availability data, latency data, signal strength data, browser data, error data, memory data, processing data, other forms of data, or combinations thereof may be used. While the examples above have been described with reference to specifics definitions of predetermined time periods for collecting data to determine whether issues exist, the predetermined time period may include any time duration that is compatible with the principles described herein. For example, the predetermined time period may have a duration of seconds, minutes, hours, days, weeks, or other time durations.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A non-transitory computer readable storage medium storing computer readable program code that upon execution causes a system to:

identify a first report based on comparing recommendation strengths of a plurality of reports in a reports library, each of the plurality of reports recommended to address a previously identified network issue that matches a current network issue, and each recommendation strength of a respective report of the plurality of reports based on a counter value indicating a number of times the respective report was opened to address a respective network issue matching the current network issue;

send, to a target location, a link to the identified first report;

responsive to the identified first report being used to address the current network issue, update a recommendation strength of the identified first report, wherein the updating of the recommendation strength of the identified first report is based on:

updating a counter value of the identified first report to reflect a number of times that the identified first report was opened with respect to the previously identified network issue and the current network issue, and a length of time between when the identified first report was opened by a user and when the current network issue was resolved; and use the updated recommendation strength to identify a report from the reports library for addressing another network issue.

2. The non-transitory computer readable storage medium of claim 1, wherein the identified first report is a most relevant report from the reports library for addressing the current network issue.

3. The non-transitory computer readable storage medium of claim 1, wherein the computer readable program code upon execution causes the system to send the link to an administrator landing page including a list of monitored applications and a status of each of the monitored applications.

4. The non-transitory computer readable storage medium of claim 1, wherein the computer readable program code upon execution causes the system to:

determine a user's response to the link; and update the recommendation strength of the identified first report based on the determined user's response.

5. The non-transitory computer readable storage medium of claim 1, wherein the computer readable program code upon execution causes the system to identify the first report further based on collected data about a network within a recent predetermined time period.

6. The non-transitory computer readable storage medium of claim 1, wherein the computer readable program code upon execution causes the system to reference data in a look-up table to identify the first report, the data representing the recommendation strengths.

7. The non-transitory computer readable storage medium of claim 1, wherein the computer readable program code upon execution causes the system to identify the first report based on comparing counter values of respective reports of the reports library.

8. The non-transitory computer readable storage medium of claim 1, wherein the identified first report has a highest recommendation strength of the recommendation strengths.

9. The non-transitory computer readable storage medium of claim 1, wherein the updating of the recommendation strength further comprises increasing the recommendation strength of the identified first report based on a length of time of use of the identified first report to address the current network issue.

10. The non-transitory computer readable storage medium of claim 1, wherein updating the recommendation strength comprises increasing the recommendation strength of the identified first report in response to an increased number of times the identified first report is used to address network issues.

11. The non-transitory computer readable storage medium of claim 1, wherein the current network issue comprises a failure of a network component.

12. A system comprising:

a processor; and a non-transitory storage medium storing program instructions executable on the processor to:

identify, from a plurality of reports, a first report for addressing a current issue in a network, the identifying of the first report from the plurality of reports based on comparing recommendation strengths of the plurality of reports, each report of the plurality of reports recommended to address a previously identified network issue that matches the current issue in the network, and each recommendation strength of a respective report of the plurality of reports based on a counter value indicating a number of times the respective report was opened to address a respective network issue matching the current issue;

send, to a target location, a link to the identified first report;

responsive to the identified first report being used to address the current issue, update a recommendation strength of the identified first report based on:

updating a counter value of the identified first report to reflect a number of times that the identified first report was opened with respect to the previously identified network issue and the current issue, and a length of time between when the identified first report was opened by a user and when the current issue was resolved; and use the updated recommendation strength to identify a report from the plurality of reports for addressing another issue in the network.

13. The system of claim 12, wherein the first report is identified based on a recommendation policy that considers status information about the current issue collected from the network within a recent predetermined time period.

14. The system of claim 12, wherein the link is sent to a landing page that includes a list of monitored applications and a status of each of the monitored applications.

15. A method comprising:

identifying, by a system comprising a processor, a first report from a plurality of reports in a report library based on comparing recommendation strengths of the plurality of reports, each recommendation strength of a respective report of the plurality of reports based on a counter value indicating a number of times the respective report of the plurality of reports was opened to address a respective network issue matching a current network issue;

sending, by the system, a message summarizing the current network issue accompanied with a link to the identified first report;

responsive to the identified first report being used to address the current network issue, updating, by the system, a recommendation strength of the identified first report, wherein the updating of the recommendation strength of the identified first report is based on:

updating a counter value of the identified first report to reflect a number of times that the identified first report was opened with respect to the previously identified network issue and the current network issue, and a length of time between when the identified first report was opened by a user and when the current network issue was resolved; and use the updated counter value to identify a report from the plurality of reports for addressing another network issue.

16. The method of claim 15, wherein the link is sent to a landing page that includes a list of monitored applications and a status of each of the monitored applications.

* * * * *